United States Patent [19]

Ecabert et al.

[11] Patent Number: 4,462,916
[45] Date of Patent: Jul. 31, 1984

[54] MULTI-ELEMENT FILTER WITH ROTARY BACKWASH ARM

[75] Inventors: Jacques Ecabert, Montmorency; Guy Aillet, Franconville, both of France

[73] Assignee: Societe d'Exploitation des Establissements, Paris, France

[21] Appl. No.: 363,488

[22] Filed: Mar. 30, 1982

[30] Foreign Application Priority Data

Apr. 3, 1981 [FR] France ............................. 81 06722

[51] Int. Cl.³ ............................................ B01D 25/38
[52] U.S. Cl. ................................. 210/798; 210/323.2; 210/333.1; 210/411; 210/414; 210/415; 210/427
[58] Field of Search ................ 210/798, 87, 137, 234, 210/323.2, 333.1, 408, 411, 414, 415, 427, 499

[56] References Cited

U.S. PATENT DOCUMENTS

| | | | |
|---|---|---|---|
| 3,132,099 | 5/1964 | Eilhaver | 210/499 X |
| 3,280,980 | 10/1966 | King | 210/333.1 X |
| 3,317,048 | 5/1967 | Kasten | 210/234 |
| 3,392,835 | 7/1968 | Asper | 210/333.1 X |
| 3,425,557 | 2/1969 | Rosaen | 210/408 X |
| 3,850,803 | 11/1974 | Adams | 210/414 X |

FOREIGN PATENT DOCUMENTS 1761827 2/1972 Fed. Rep. of Germany ... 210/333.1

Primary Examiner—David R. Sadowski
Attorney, Agent, or Firm—Kane, Dalsimer, Kane, Sullivan & Kurucz

[57] ABSTRACT

The apparatus comprises an enclosure divided into two compartments (13 and 14) by a partition wall (15) which has a circular row of apertures (16). Filtering elements (26) of hollow tubular shape are fixed in one (13) of the compartments by an open end on each one of the apertures (16). A rotary tubular arm (20) is mounted in the other compartment (14) and has an end which sweeps along the circle of apertures and coincides with each one of the apertures in turn. The arm has a device (21) at the rotatable end of the arm (20) for closing an aperture (16) of the partition wall (15) and the orifice (51) of the end of the arm and a suction pump (P) for applying a sudden counter-current hydraulic shock through the wall of each filtering element (26) in turn is provided.

6 Claims, 7 Drawing Figures

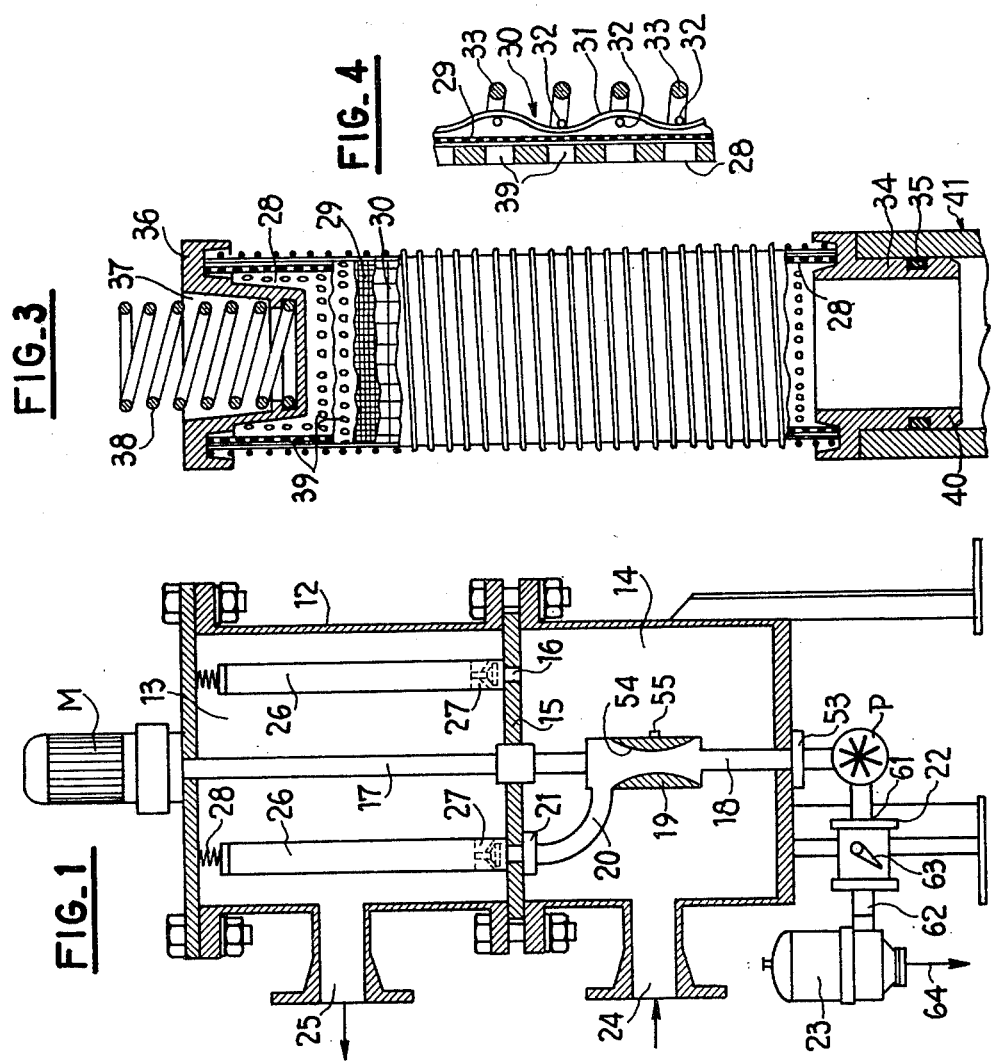

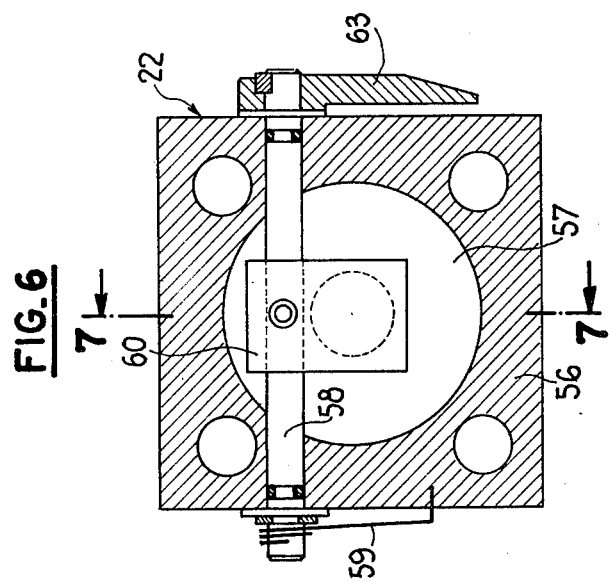
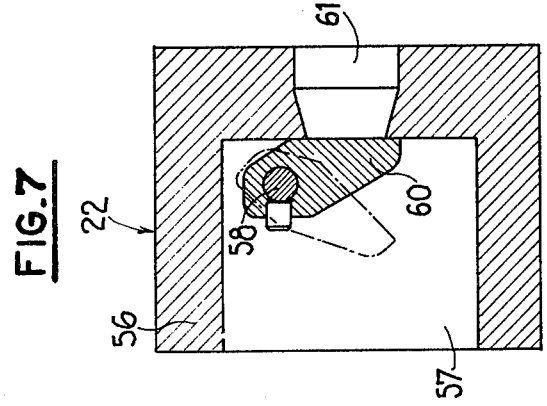

MULTI-ELEMENT FILTER WITH ROTARY BACKWASH ARM

DESCRIPTION

The present invention relates to the filtration of fluids, and more particularly to the continuous and automatic cleaning of multi-element filters for oils and fuels for engines.

It is known that it is essential to continuously filter the oils and fuels employed in engines and, in particular, in Diesel engines. There are already known continuous filtering installations employing a regeneration which is used with Diesel engines and in which the oil (or the fuel) taken from the engine is sent by a pump into an apparatus containing a vertical cylindrical enclosure divided horizontally by a partition wall into two superimposed compartments, tubular filtering elements being fixed vertically in one of the compartments by one end above corresponding apertures provided in the separating partition wall, their other end being closed.

Mounted in the other compartment is a rotary vertical shaft having a lateral arm which continuously rotates and whose end comes into coincidence in turn and in a sealed manner with the aperture of the partition wall, on the lower side of the latter, which corresponds to each filtering element. The soiled oil coming from the engine is sent by the pump into the compartment containing the rotary arm, it filters through the walls of these filtering elements from the inside toward the outside and is received in the opposite compartment.

In order to regenerate the filtering elements, i.e. remove therefrom impurities when the arm coincides with the aperture corresponding to a filtering element, a pressure is applied through the arm in the opposite direction to the normal filtering pressure so as to detach the impurities retained in the filtering parts and reject them in the opposite direction through the interior of the filtering elements and discharge them through said rotary arm, as described in the German Pat. No. 1 761 827.

These apparatus have a number of drawbacks. The filtering elements employed, which usually comprise a perforated metal tube acting as a support for a plurality of sleeves and a filter cloth, cannot be completely cleared of clogging products by the simple application of a counter-pressure through the rotary arm and must be thereafter disassembled so as to be cleared or cleaned of the many impurities which remain retained in the inner sleeve so that, when the filtering pressure is again applied, these impurities are again applied against the filter cloth and consequently the filtering capacity of the latter is very distinctly reduced.

An object of the invention is to overcome these drawbacks and to provide a process for filtering fluid and a fluid filter employing an automatic regeneration, by means of which the impurities which were retained thereby are completely removed, which increases their duration of use and consequently provides an apparatus having a very reliable operation over a very long period of time.

Another object of the invention is to provide such a filter which operates under a reduced minimum operational pressure.

The invention accordingly provides a process for continuously filtering a fluid in an apparatus of the type comprising an enclosure internally divided into two compartments by a partition wall including at least one circular row of apertures, filtering elements of hollow tubular shape closed at one end and fixed in one of the compartments by their open opposite end to each of said apertures of the partition wall, a rotary tubular arm which is mounted in the other compartment and whose end sweeps along said circle of apertures so as to coincide with each one thereof in turn, and in which the fluid to be filtered is admitted under pressure into the chamber containing the rotary arm, comprising passing said fluid through the filtering elements from the interior toward the exterior, collecting the filtered fluid in the compartment which contains the rotary arm, and creating a pressure drop across the wall of a filtering element, across said rotary arm and receiving through said arm the resulting current of fluid charged with the impurities which were arrested by said filtering element, wherein, in a first stage, a filtering element is isolated from the fluid inlet compartment, the opening of the rotary end of the arm is closed and a depression inside said arm is simultaneously applied and, in a second stage, a sudden counter-current hydraulic shock is produced through the wall of the filtering element while maintaining it in communication with the opening of said end of the arm and the current of fluid charged with impurities is discharged under pressure and said isolating and hydraulic shock stages are repeated cyclically on all the filtering elements in turn.

Another object of the invention is to provide a fluid filtering apparatus of the aforementioned type, wherein there is provided a device for applying a sudden counter-current hydraulic shock through the wall of each filtering element in turn.

According to another feature of the invention, said device comprises means at the rotary end of the arm for closing an aperture of the partition wall and the orifice of said end of the arm and a suction pump.

Further features and advantages of the invention will be apparent from the ensuing description with reference to the accompanying drawings which are given merely by way of example and in which:

FIG. 1 is a diagrammatic sectional view of a fluid filtering installation according to the invention;

FIG. 3 is a sectional, view with a part cut away, of a filtering element of the apparatus shown in FIG. 2;

FIG. 4 is a partial sectional view, to an enlarged scale, of a part of the wall of the filtering element shown in FIG. 3;

FIG. 6 is a sectional view of a regeneration indicating device of the apparatus according to the invention, and FIG. 7 is a sectional view taken on line 8—8 of FIG. 6.

Figure 5:
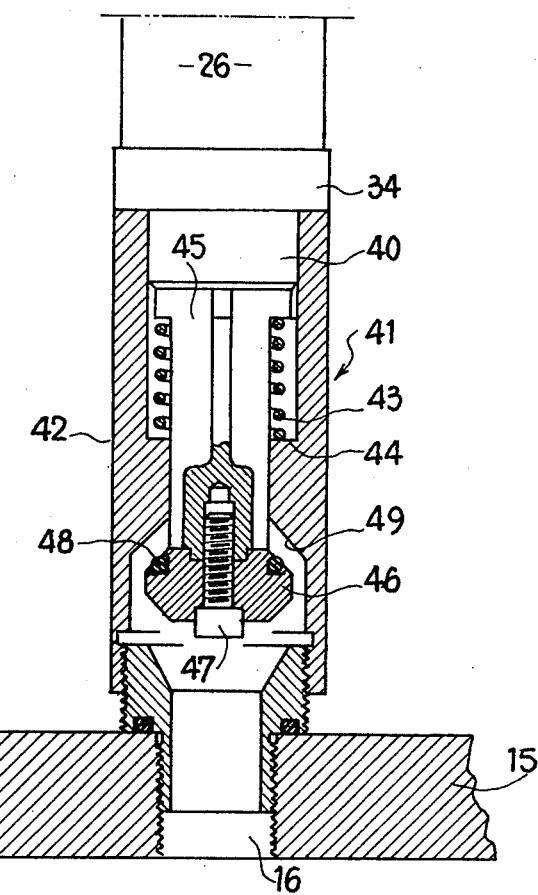
FIG. 5 is a sectional view of a lower end valve of a filtering element.

FIG. 1 shows diagrammatically a fluid filtering installation according to the invention which comprises an enclosure having an inlet opening 24 and an outlet opening 25 and usually in a cylindrical shape and disposed vertically and divided into two superimposed chambers 13, 14 by means of an intermediate partition wall 15 provided with apertures 16 disposed on at least one circle. Disposed in upper chamber 13 are tubular filtering elements 26 which are closed at their upper end and whose open opposite end is fixed on the partition wall 15 in confronting relation to each of the apertures 16.

A driving device M is adapted to drive in rotation a tubular arm 18, 20 in the shape of a crank and having an end 20 which is adapted to come into coincidence with each of the apertures 16 in turn through a shoe 21. Each filtering element 26 comprises a perforated tubular metal support on which are disposed filtering means such as filter cloths of different types, usually a first sleeve, a filter cloth and a second sleeve.

A polluted fluid to be cleaned is admitted under pressure into the inlet chamber 14 by way of an inlet opening 24 and the pressure is exerted on the walls of the filtering elements 26 from the interior toward the exterior of the latter and the cleaned filtered fluid is received in the outlet chamber 13 from which it is discharged by way of an outlet opening 25.

The apparatus described up to this point is known in particular from the German Pat. No. 1 761 827, and operates in the following manner.

In the course of its rotation, the end 20 of the arm 18 coincides in turn with an aperture 16 corresponding to the interior of a filtering element 26. When this element is thus connected to the atmosphere by way of the tubular arm 18, the pressure of the fluid in the outlet chamber 13, which is higher than the atmospheric pressure, detaches the impurities accumulated in the filtering element.

Unfortunately, in the installations of this type, this pressure drop does not permit detaching all of the impurities accumulated on the filtering elements and it has been found that a good part of these impurities remained retained in the filtering sleeve of cloth, in particular in the inner sleeve, and became thereafter once more applied against the wall of the filtering element when the pressure on the latter was re-established, i.e. when the end of the rotary arm 20 had left this element to coincide with the following element.

According to the invention, the rotary arm 20 is connected to a device whereby it is possible to apply a sudden counter-current hydraulic shock across each filtering element from the exterior toward the interior of the latter.

This device comprises, on one hand, means for closing and opening the apertures 16 of the partition wall 15, and, on the other hand, means for applying a depression on the filtering element 26 fixed on the aperture 16 when the latter is opened.

Figure 2:
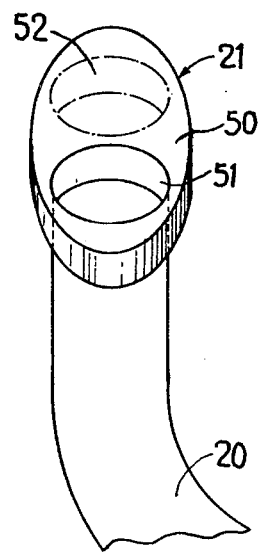
FIG. 2 is a partial perspective view of the closing means provided at the end of the rotary arm.

The means for closing and then opening the apertures 16 are formed by the shoe 21 fixed to the end of the arm 20 and adapted to slide along the lower surface of the partition wall 15 and having, along the circle described by the arm, a length which is substantially greater than the sum of the diameters of an aperture 16 and of the arm 20 so that a part 52 of the shoe 21 first of all covers and completely closes an aperture 16 while the orifice 51 of the arm is itself at this moment completely closed (FIG. 2).

The means for applying a depression on the filtering element fixed to the aperture 16 comprise a pump P inserted in the outlet circuit of the arm 20.

The end of the arm 20 opposed to the closing means 21 is connected to the upper part of the case of a flow regulating device 19 which will be described in detail hereinafter and which is mounted in a section 18 of a rotary hollow shaft which is coupled to a centre shaft 17 extending through the apparatus and driven in rotation by a motor M, for example mounted in the upper part of the apparatus.

The lower end of the hollow shaft section 18 which communicates with the lower end of the flow regulator 19 is connected to the inlet of a pump P whose outlet is connected to a regeneration indicating device 22 whose outlet is connected to a centrifugal purifier 23, as will be described hereinafter.

The regulator 19 comprises a body or case which may be cylindrical and which communicates by the end thereof opposed to the arm 20 with the inner space of the shaft section 18 which extends outwardly of the apparatus through the bottom of the compartment 14 by way of a rotary sealed joint 53 and the regulator comprises internally a sleeve 54 formed by an elastically yieldable diaphragm which is fixed in a sealed manner by the periphery of the two ends thereof to the inner wall of the case. An orifice 55 provided with a valve communicates with the space defined between the wall of the case of the regulator and the diaphragm 54. The operation of this regulator will be explained in more detail hereinafter.

The end of the shaft section 18 outside the apparatus is connected to the regeneration indicating device 22 which is shown in FIGS. 6 and 7. This regeneration indicating device 22 comprising a hollow body 56 having for example roughly the shape of a cube which is open on one side and defines an internal chamber 57 through which extends a shaft 58 which is biased by a spring 59 and carries a valve closing member 60 in such manner that the latter is applied against an orifice 61 provided in the side of the body opposed to the open side thereof. The shaft 58 extends outside the body 22 and a pointer 63 is keyed on the end thereof.

The body of the device 22 is adapted to be fixed with its orifice 61 connected to the outlet end of the shaft section 18 outside the apparatus, its open side being closed by means of a plate having an orifice (not shown) and adapted to be connected by a conduit 62 to the inlet of the centrifugal purifying device 23.

FIG. 3 shows a filtering element 26 according to the invention which comprises a tubular perforated metal body 28 which is shown partly, to an enlarged scale, in FIG. 4, and on the outer surface of which is applied a filter cloth 29, for example of polyamide which is itself covered with an outer sleeve 30, for example of polyester comprising warp threads 31 and weft threads 32.

The assembly is surrounded by a metal wire 33 which is wound helically with a slight radial clearance (which is exaggerated in FIG. 4 for reasons of clarity).

One end of the tubular support 28 covered with the filter cloth 29, the outer sleeve 30 and the outer winding 33, is received in a peripheral groove of a socket 34 including a sealing element 35, and the upper end of the tubular support 28, which is also surrounded by the filter cloth 29, the outer sleeve 30 and the helical wire 33, is received in a sealed manner in a peripheral groove of a cap 36 having a centre cup 37 in which an outer compression coil spring 38 is disposed.

Note in this respect that the filtering elements of the prior art, in which the filtering is carried out from the exterior toward the interior, usually comprise on the perforated metal tubular support an inner sleeve similar to the sleeve 30, disposed between the support and the filter cloth sleeve, and note that the filtering element according to the invention does not include an inner sleeve, which represents an economy relative to the prior art.

In order to support better the filter cloth 29 which the filtering pressure applies against the support 28, the latter has a network of apertures 39 which is denser than that of the conventional supports and these apertures have such diameter and pitch that the support 28 can effectively support the filter cloth 29. For this purpose, the apertures have a diameter of 2 mm and a pitch of 4 mm. The sleeve 30 has a weft thread 32 which is annular and has a diameter exceeding the diameter of the warp thread 31 in a proportion of 1:2. Preferably, the weft thread has a diameter of 4/10 mm and the warp thread a diameter of 2/10 mm.

The metal wire 33 is wound helically with its turns relatively close together for a purpose which will be described hereinafter.

The lower end 40 of the socket 34 is fitted in a sealed manner by means of the sealing element 35 in the upper end of a check valve device of known type generally designed by the reference numeral 41 and shown in section in FIG. 5.

The check valve device 41 comprises a hollow body 42 having at one end an inside diameter corresponding to the outside diameter of the end 40 of the socket 34.

The body 42 has a bore in which is disposed a compression coil spring 43 which bears at one end against an inner shoulder 44 of the bore and bears at the opposite end against a cross-shaped guiding means 45 which carries at its opposite end a closing valve member 46 held in position by a screw 47 and adapted to bear in a sealed manner through a sealing element 48 against an annular seat 49 formed inside the body.

The end of the body 42 beyond the valve member 46 is adapted to be fixed in a sealed manner to the aperture 16 of the partition wall 15.

The assembly constitutes a valve which is so adapted that the end of the guiding means 45 is shifted in opposition to the action of the spring 43 when the end 40 of a filtering element 26 is inserted and fixed in the body 42 so that the valve member 46 is thus shifted away from the seat 49 and opens the communication between the inner space of the filtering element 26 and the aperture 16 by way of the partition wall 15.

The lower surface of the partition wall 15 is polished so as to cooperate with a sealed contact with the upper surface 50, which is also polished, of the shoe 21 fixed to the end of the rotary arm 20, which shoe may be constituted by a plate 50 including an orifice 51 and having on the circle described such length that the part 52 of the plate 50 completely closes an aperture 16 while at the same time the orifice 51 is itself closed at a given moment of the movement of rotation of the arm 20.

By means of this arrangement, and depending on the direction of rotation of the arm, an aperture 16 is always closed before it is suddenly brought into coincidence with the orifice 51.

The filtering apparatus according to the invention operates in the following manner.

A fluid, for example polluted oil coming from a Diesel engine, is supplied under pressure by means of a pump (not shown) to the inlet opening 24 and the compartment 14. As the rotary arm 20 is in contact through its closing means 21 with the lower surface of the partition wall 15 in alignment with an aperture 16 communicating with a filtering element 26, the interior of the other filtering elements 26 freely communicate with the compartment 14 and the oil under pressure enters the interior of the filtering elements by way of the apertures 16.

The polluted oil passes through the orifices 39 of the support 28 and is then filtered by the filter cloth 29 and the outer sleeve 30. The oil issuing by way of the walls of the filtering elements 26 fills the compartment 13 from which it is set back to the engine by way of the outlet opening 25.

The shafts 17, 18 and, together with the latter, the flow regulator 19 and the rotary arm 20 with its shoe 21, are driven in rotation by the motor M in such manner that the centre orifice 51 of the shoe 21 coincides in turn with each one of the apertures 16 in the known manner.

As the pump P operates continuously, it applies a depression in the flow regulator 19 and in the arm 20, which depression is maintained so long as the orifice 51 is closed by the contact of the closing means 21 with the partition wall 15 between the apertures 16.

Before the orifice 51 coincides with an aperture 16, the latter is first of all closed by the part 52 of the plate 50 adjacent to the orifice 51.

At this moment, the corresponding filtering element 26 is isolated from the compartment 14 in which the polluted oil under pressure enters and the pressure drop across its wall is temporarily cancelled out. As no pressure is then exerted from the interior toward the exterior, the impurities are no longer applied against the inner wall of the filtering element.

As the arm 20 pursues its rotation, the orifice 51 then coincides with the aperture 16. The interior space of the filtering element 26 is then suddenly subjected to the depression prevailing in the arm 20 and to the suction effect of the pump P.

The sudden hydraulic shock which results has for effect to detach the impurities retained inside the filtering element 26 and to expel them by way of the arm through the regulator 19 and the device 22 to the purifier 23 with a current of oil under pressure.

As the arm 20 pursues its rotation, it then closes the aperture 16 corresponding to the following filtering element 26 which it isolates from the chamber 14, then the orifice 51 coincides with this aperture and in turn subjects this element to the same hydraulic shock.

The filtering elements 26 are thus subjected in turn cyclically to the hydraulic shock effect which occurs each time the orifice 51 coincides with an aperture 16, from the interior of the compartment 13 by way of the filtering element so that the impurities are expelled by way of the arm 20.

The current of oil carrying the impurities along therewith is projected outwardly with succcessive impulses. The volume of oil charged with impurities and pumped by the pump has for effect to displace the valve member 60 of the device 22 and drives the shaft 58 and consequently the pointer 63 which thus effects a swinging movement indicating the satisfactory operation of the apparatus.

However, the centrifugal purifier 23 must preferably receive a continuous current of oil. For this purpose, the flow regulator 19 is previously charged with compressed air introduced by way of the valve 55 which inflates and deforms the diaphragm 54 toward the interior and thus throttles the section of passage in the case of the regulator. When a current of oil charged with impurities coming from the interior of the filtering elements 26 enters the regulator, the pressure has for effect to urge the diaphragm 54 outwardly, which is allowed by the pressure of the air compressed between the diaphragm and the wall of the body. The diaphragm elastically yields under the pressure of the oil and the internal volume of the regulator increases and this has for effect to absorb the pressure wave produced by the flow of oil coming from the filtering element. When the arm 20 continuous to rotate, the successive flows of oil under pressure coming from each filtering element 26 in turn are thus rendered regular by the regulator 19.

Consequently, when the apparatus operates in a satisfactory manner, the pointer 63 of the device 22, instead of effecting a swinging movement indicating the successive pressure waves produced by the oil expelled from the filtering elements, assumes a roughly stable mean position which indicates a correct continuous filtering in the apparatus and the roughly continuous arrival of a current of oil in the centrifugal purifier 23 which may then operate in a satisfactory manner and the purified oil is received at the outlet 23 of the purifier 64 for being sent back to the engine.

The process and the apparatus of the invention permit the obtainment of a practically instantaneous clearing of the filtering elements after having previously stabilised the pressure inside and outside the filtering elements by closing the outlet of the latter. In this way a cyclic operation in three stages is achieved.

Indeed, according to the illustrated embodiment, in an initial stage of the operation, all of the filtering elements less one (that with which the rotary arm 20 is connected) is employed for filtering the oil and, when the arm starts to rotate, it closes first of all the outlet of the following element (in the direction of rotation of the rotary arm) and thus establishes a balance of the pressures inside and outside the wall of this element and thereafter puts the latter in instantaneous communication with the suction side of the pump and thus produces a considerable and sudden hydraulic shock which has for effect to detach from the filter cloth and the outer sleeve all the particles of impurities which may have been trapped therein. This clearing is facilitated by the prior establishment of a balance of pressure during which the particles are no longer applied with force against the walls of the filter, which facilitates the detachment.

The apparatus according to the invention has also a considerable advantage owing to the presence of the valves interposed between the partition and the filtering elements which are adapted to be automatically opened when a filtering element is disposed in position and to close when the filtering element is withdrawn. Consequently, if need be, if a filtering element has for example become deteriorated, it is possible to withdraw it for repairs and put the apparatus immediately back into operation, the corresponding aperture 16 being automatically closed by the valve. In operation, when the closing means 21 come into coincidence with the aperture corresponding to the place where there is no filtering element, there is merely produced an inoperative stage of the operation. The pressure prevailing in the compartment 14 is higher than that prevailing in the compartment 13 and the valve member 46 is therefore automatically applied against its seat and thus closes the passage when the aperture 16 is uncovered, the force of the spring being sufficient to maintain the valve closed when the aperture coincides with the orifice 51 and is connected to the pump P.

The direction for clearing from the exterior toward the interior has for result to exert on the filter cloth 29 (FIG. 4) forces which are exerted alternately in opposite directions, the filter cloth 29 being moved away from the support 28 during the filtering and being applied against said support when clearing the filtering element.

The filter cloth is effectively supported by the network of apertures in the support 28, which is denser than in the filtering elements of similar type employed in the apparatus of the prior art, when it is applied thereagainst by the exterior pressure. When it is separated from the support 28, it is supported by the outer sleeve 30. It has been found that this outer sleeve constructed as indicated hereinbefore, was quite satisfactory for suitably maintaining the filter cloth up to pressure drops of 3 to 5 bars at temperatures of the fluid to be filtered of up to 50° C.

Beyond this temperature, the plastics material of the weft threads and warp threads of the sleeve no longer offer sufficient resistance and the metal wire 33 wound helically with relatively closely wound turns around the sleeve provides the latter with sufficient support for carrying out filtering operations at temperatures which may be as high as 90° C. and with a pressure drop which may be as much as 10 bars. If desired, it is possible to obtain a satisfactory operation at still higher temperatures and pressures by providing a metal wire 33 of appropriate diameter with a suitably small winding pitch.

Note that owing to the upper end cap provided with its spring 38, each filtering element may be disposed and easily maintained in position in the apparatus, fitted on the upper end of the body of the valve, the spring 38 bearing against the cover of the apparatus and holding the filtering element in position.

It will be clear from the foregoing that the apparatus according to the invention results in many improvements and advantages over the apparatus of the same type of the prior art with means for supervising the operation and a recovery of the polluted filtered fluid contained in the filtering elements.

Note that the vacuum created between the pump and the filtering element increases the pressure difference which prevails in the region of the filtering material of the filtering element. For a depression of 0.5 bar, 1.5 bars of outlet pressure are sufficient to obtain 2 bars of differential pressure required for a good regeneration of the filtering elements.

Having now described our invention what we claim as new and desire to secure by Letters Patent is:

1. In a process for continuously filtering a fluid in an apparatus comprising an enclosure divided internally into an inlet compartment and an outlet compartment by a partition wall defining at least one circular row of apertures, filtering elements of hollow tubular shape closed at one end and fixed in the outlet compartment by an open opposite end of the filtering elements on each one of said apertures of the partition wall, a rotary arm defining a hollow interior mounted in the inlet compartment and having a portion which defines an orifice communicating with the interior of the arm and which sweeps along and against the partition wall and along said circular row of apertures so that said orifice coincides with each one of the apertures in turn, and in which apparatus the fluid to be filtered is admitted under pressure into the inlet compartment, said process comprising supplying said fluid under pressure to the inlet compartment and passing said fluid through the filtering elements from the interior toward the exterior of the filtering elements, receiving filtered fluid in the outlet compartment and, for the purpose of clearing each filtering element, creating a pressure drop across each said filtering element by way of said orifice and the interior of said rotary arm as said arm is rotated relative to said partition wall and receiving through the interior of said arm a resulting current of said fluid charged with impurities which had been arrested by said filtering element; the improvement comprising in combination creating a suction in the interior of said arm by means of a suction pump, creating said pressure drop by first hermetically closing the aperture communicating with said each filtering element by means of a shoe which is carried by said orifice defining portion of said arm and is in permanent sealing contact with said partition wall and completely covers the aperture communicating with said each filtering element immediately before said arm orifice reaches each said aperture, said arm orifice is initially closed by the partition wall so that said suction created by said suction pump is at a maximum, and thereafter, as said arm continues to rotate, putting said arm orifice in full coincidence with said aperture communicating with said each filtering element, and ensuring that only one of said apertures at a time communicates with the interior of said arm, thereby producing a sudden counter-current hydraulic shock through said each filtering element.

2. In an apparatus for continuously filtering a fluid comprising an enclosure, a partition wall defining at least one circular row of apertures and dividing the enclosure internally into a fluid inlet compartment and a filtered fluid outlet compartment, filtering elements of hollow tubular shape closed at one end and open at an opposite end of the filtering elements, the filtering elements being mounted on the partition wall in the outlet compartment and respectively coinciding with the apertures, an arm defining a hollow interior, mounted in the fluid inlet compartment to rotate about an axis and having a portion defining an orifice communicating with the interior of said arm, said arm portion being capable of sweeping along said circle of apertures and along and against said partition wall so that said orifice coincides with each of said apertures in turn, means for rotating said arm about said axis, retaining means interposed between the filtering elements and the partition wall for retaining the filtering elements and means for causing said fluid to flow from said inlet compartment to said outlet compartment through said apertures and the respective filtering elements; the improvement comprising in combination a suction pump, means communicating the suction pump with the interior of said arm when it is desired to clear each filtering element of impurities, shoe means carried by said portion of said arm, having such size and configuration to lead the orifice relative to the direction of rotation of said arm and is constantly in contact with said partition wall for completely covering each aperture immediately before said arm orifice reaches each said aperture as said arm rotates, which orifice is initially completely closed by the partition wall, and means for ensuring that only one of said apertures at a time communicates with said interior of said arm as said arm rotates, whereby each filtering element is first completely closed off from said inlet compartment and then alone suddenly put into communication with and subjected to suction in said interior of said arm.

3. An apparatus according to claim 2, wherein, said apertures and orifice are circular thereby each defining a diameter, and said shoe means has, along said circular row, a length substantially greater than the sum of the diameter of each of said apertures and the diameter of said orifice.

4. An apparatus according to claim 2, wherein each filtering element comprises a perforated tubular metal support, a filter cloth surrounding the tubular support, a sleeve covering the filter cloth and a helically wound metal wire surrounding the sleeve, said perforated support defining a network of perforations which have a diameter of substantially 2 mm and are spaced substantially 4 mm apart from one another.

5. An apparatus according to claim 4, wherein the sleeve comprises weft and warp threads each defining a diameter, the weft thread diameter being greater than the diameter of the warp thread in a proportion of substantially 2:1.

6. An apparatus according to claim 5, wherein the weft thread has a diameter of substantially 4/10 mm and the warp thread a diameter of substantially 2/10 mm.

* * * * *

UNITED STATES PATENT AND TRADEMARK OFFICE
CERTIFICATE OF CORRECTION

PATENT NO. : 4,462,916

DATED : July 31, 1984

INVENTOR(S) : ECABERT and AILLET

It is certified that error appears in the above-identified patent and that said Letters Patent is hereby corrected as shown below:

On the title page;

The Assignee name listed should be --Societe d'Exploitation des Etablissements Rellumix--.

Column 1, Line 13, "regeneration" should be --regenerator--;

Column 3, Line 6, "are" should be --is--;

Column 7, Line 2, "continuous" should be --continues--.

Signed and Sealed this

Twenty-second Day of October 1985

[SEAL]

Attest:

DONALD J. QUIGG

Attesting Officer

*Commissioner of Patents and Trademarks—Designate*